(12) United States Patent
Sakamoto

(10) Patent No.: US 7,684,287 B2
(45) Date of Patent: Mar. 23, 2010

(54) DISC CHANGER

(75) Inventor: Hideki Sakamoto, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 782 days.

(21) Appl. No.: 11/399,309

(22) Filed: Apr. 6, 2006

(65) Prior Publication Data

US 2006/0262669 A1 Nov. 23, 2006

(30) Foreign Application Priority Data

Apr. 20, 2005 (JP) ............................. 2005-123031

(51) Int. Cl.
*G11B 17/22* (2006.01)
(52) U.S. Cl. .................. 369/30.3; 369/30.03; 369/53.2
(58) Field of Classification Search ............... 369/30.3, 369/53.2, 30.06, 30.2, 47.16, 53.22
See application file for complete search history.

(56) References Cited

U.S. PATENT DOCUMENTS

| | | | | |
|---|---|---|---|---|
| 5,499,225 A | * | 3/1996 | Yoshimura ............... | 369/53.24 |
| 5,831,966 A | * | 11/1998 | Taira et al. ............... | 369/275.3 |
| 5,864,522 A | | 1/1999 | Sugano et al. | |
| 6,625,097 B1 | * | 9/2003 | Sakurai ..................... | 369/53.2 |
| 6,879,554 B2 | * | 4/2005 | Shimamura et al. ...... | 369/53.22 |
| 2004/0257943 A1 | | 12/2004 | Kll et al. | |

FOREIGN PATENT DOCUMENTS

| | | |
|---|---|---|
| JP | 2002-050168 | 2/2002 |
| JP | 2004-348785 | 12/2004 |

* cited by examiner

*Primary Examiner*—Thang V Tran
*Assistant Examiner*—Brenda Bernardi
(74) *Attorney, Agent, or Firm*—Brinks Hofer Gilson & Lione

(57) ABSTRACT

A disc changer is provided which can perform a disc check in a short time which involves checking whether or not each disc loaded in the disc changer is reproducible in loading CDs on the changer. File system data is selected from management data of a selected disc and reproduced by a file system data selector. The selected file system data is analyzed by a file system data analyzer, and a condition of the analysis is monitored by a reproducible file detector. When a reproducible file is detected, the analysis is suspended, a result of a disc check is generated, and a next disc may be checked.

18 Claims, 4 Drawing Sheets

F I G. 1
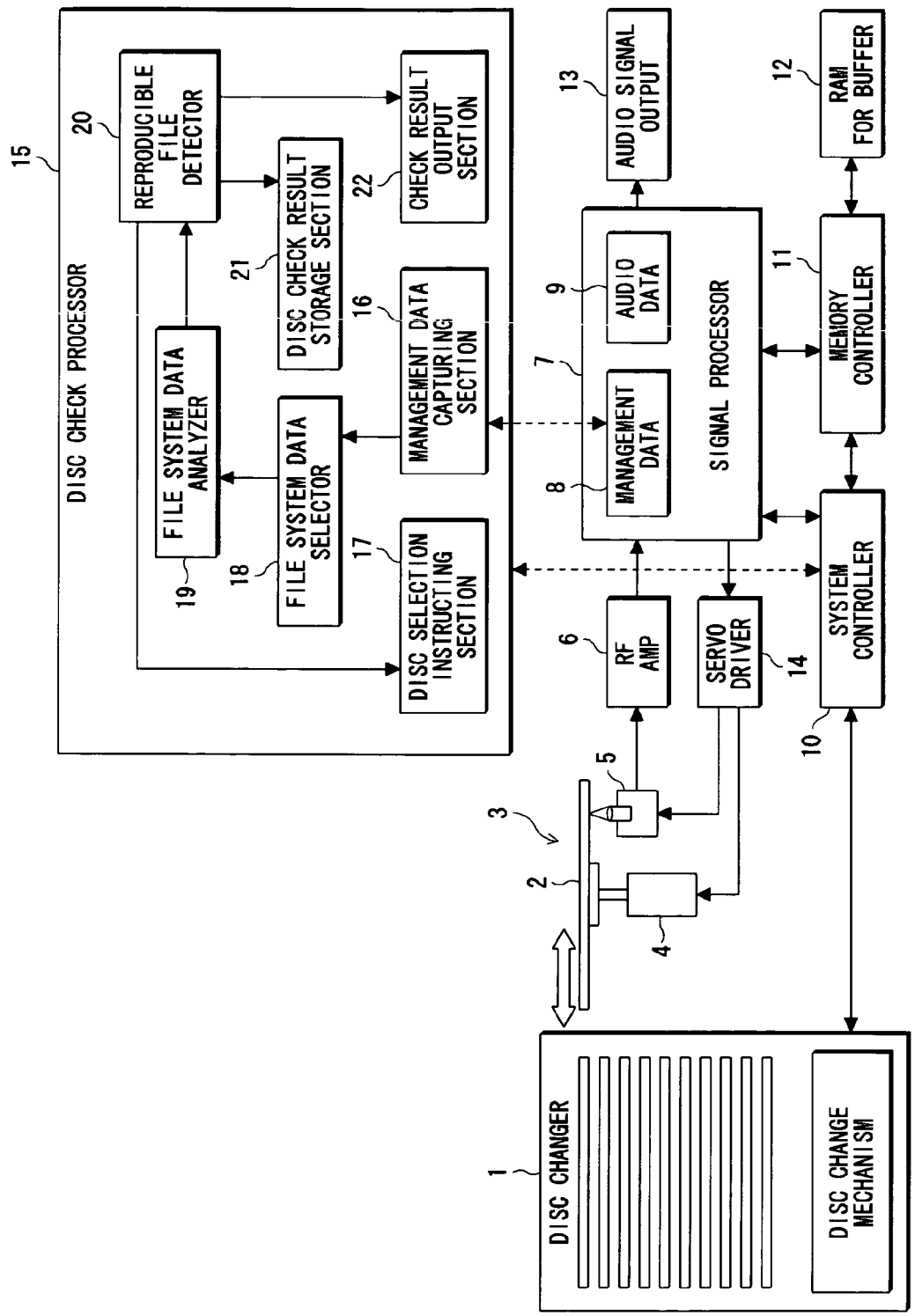

DISC CHANGER

BACKGROUND OF THE INVENTION

1. Field of the Invention

The present invention relates to a disc changer for holding a plurality of compact discs (hereinafter referred to as a CD), for example, and for selecting and reproducing an arbitrary disc therefrom. More particularly, the invention is directed to a disc check method in a disc changer for checking in advance whether a CD on which various kinds of data not reproducible by a player is recorded is inserted therein or not, and a disc changer implementing the method.

A CD reproduction processor including a disc changer performs a reproduction process using a system such as that shown in FIG. 3. That is, in the example shown in the figure, the system is an audio CD player. A plurality of CDs 31 is held in a disc changer 30. Any one of the CDs can be selected to be loaded and played by a player 32, which is rotatably driven by a spindle motor 33, so that data recorded on the disc is read out by a pickup 34. An RF signal, a focus error signal, a tracking error signal, and the like are read and fed into and processed by a signal processor 36 through an RF amp 35.

A disc check unit 45 checks whether or not a file reproducible by the player, such as mp3, exists by analyzing a file system among various data pieces of management data 37 from the above-mentioned signals. After the file system is analyzed, when reproducible audio data exists, the disc check unit generates a message indicating the presence of the audio data. In the reproduction process of the reproducible disc, audio data 38 about audio information is separated from the management data 37, which is provided to a system controller 40 to serve as data for controlling various components. In the example shown, a given amount of the audio data 38 corresponding to a predetermined time is recorded in a RAM 42 for a buffer by a memory controller 41 to which an instruction for the process is given by a system controller 40.

The audio data recorded in the buffer RAM 42 as mentioned above by the memory controller 41 based on the instruction from the system controller 40 is in turn read into the signal processor 36 to carry out audio signal output 43. The signal processor 36 controls driving of the spindle motor 33 and the pickup 34 by a servo driver 44, while dealing with the focus errors and the tracking errors as mentioned above.

In recent years, the CD has been widely used as follows. For example, in addition to the fact that a commercially available CD, which is conventionally usable, can be reproduced, a copied CD may be reproduced, or audio data may be recorded on a CD by a personal computer or the like to be reproduced by an audio player. Particularly, when dealing with the audio data through the personal computer, a great number of very specific recording systems can be used.

For example, the recording systems presently used include, for example, CD audio track format-.cda, Windows audio format-.wav, Mac audio format-.aiff/.aif, Sun audio format-.au/.snd, MPEG audio format-.mp3, audio data of Real Audio player-.ra/.ram, a sound file of MIDI base-.mid/.midi., Quick Time video file format-.mov/.qt, Window Media audio format-.wma, Advanced Streaming Format-.asf, Advanced Audio Cording format-.aac, and Ogg Vorbis format-.ogg, and the like.

These various types of audio data recording systems can record data on the respective media, including a CD-R and a CD-RW, as it is. Thus, the CD-R or the like for the audio made by a user in each case has the corresponding audio data recorded in one of various formats. Although the general CD player is required to be capable of reproducing as many of the various types of audio data as possible, it is impossible to install and prepare for reproduction software for all types of audio data from the viewpoint of cost. Thus, in order to deal with the typical audio formats, some presently used audio players can reproduce MP3 data as well as the known CD audio data (CD-AD).

When the audio data is recorded on the CD-R or the like, and is intended to be reproduced by the CD player, the CD-R or the like of interest which has recorded therein only data unreproducible by the player cannot be reproduced. In particular, the CD-R, which has been widely used by personal computers, may record therein not only various types of audio data mentioned above, but also images, including an image photographed by a digital camera, and an image captured by the Internet. Even if the CD player intends to reproduce such a CD-R, the CD-R may include only data unreproducible by the CD player.

Particularly, when a number of CDs are loaded in a CD changer, and any of the CDs is intended to be selected and reproduced, the above-mentioned CD which records therein only data unreproducible by the player cannot be reproduced in response to an instruction for reproduction of the CD, which may frustrate the user. For this reason, upon loading of the CD in the CD changer, the CD changer is generally designed to perform a disc check of the CD. In the prior art example as shown in FIG. 3, the disc check unit 45 analyzes the file system of the management data 37 recorded on the CD in response to an instruction from the system controller to detect whether or not the CD can be reproduced by the CD player, that is, whether or not a reproducible file exists in the CD.

Some known CD reproduction apparatus including a CD disc changer employ a reproduction technique which involves checking whether the loaded disc is reproducible or not when an actual instruction for reproduction is entered by the user after loading and setting the disc in the disc changer, and reproducing a disc which is determined to be reproducible. Also, another known CD reproduction apparatus employs a technique which involves checking all discs loaded on the disc changer in succession to determine whether each disc is reproducible or not when one disc is loaded and set in the disc changer, individually recording the presence of the reproducible disc, and lighting up a lamp corresponding to the reproducible disc in order for the user to understand this condition, if necessary.

The detection of whether or not the selected disc is reproducible in the disc check as mentioned above conventionally involves analyzing the entire file system of a management data part first recorded in the disc, and determining how the data of the disc is structured, and in which format the data is recorded on the disc.

That is, the data structure of the CD is specified by the ISO 09660 specification, wherein a great number of types of data recordable on the CD are specified so that various systems can use the CDs. Each CD selects and records therein appropriate necessary data from among the data, as well as the essential data. In a lead-in area of the CD as shown in FIG. 4, the first 16 sectors are reserved for a system area dedicated to the system, followed by a plurality of volume descriptors which are arranged and recorded for each sector. Each volume descriptor includes a PVD, an SVD, a volume section descriptor, a starting record, a volume descriptor set final terminal, and the like.

Following the volume descriptor, a path table including an L type path table, which is a small path table, and an M type path table, which is a large path table, are recorded as an information path table for the entire CD. Then, a directory indicative of a file structure of the CD is recorded. This directory can record a root directory R as level 1, and others up to level 8, and may record therein a directory identifier, a file identifier, a sector number of the first sector of file data recorded as an extent, a data length in units of bytes of the data, a file flag, and recording date and time, followed by recording of data of each file as the extent.

In performing the disc check by the CD changer, whether or not data reproducible by the player exists in the CD data structure described above is determined by analyzing all management data other than audio data in the file system. More specifically, in the example of FIG. 4, the file structure of the CD in the directory part includes files A, B, C, etc., constructed based on the root directory R, file A1, etc., expanded from the file A, mp3 data of file A11 expanded from the file A1, file A12, file A13, file A14, etc., which is mp3 data, a file A121 expanded from the file A12, a file A122 which is mp3 data, a file A1211 expanded from the file A121, a file A1222, which is mp3 data, and the like. The file system as described above is completely analyzed, and based on the analysis result, it is checked whether a file reproducible by the player exists or not, that is, whether the disc is reproducible or not. Depending on the complexity of the file structure, it often takes several tens of seconds to check one CD.

JP-A No. 185747/2004 discloses a reproduction method which can reduce the time for checking discs when a CD is actually played back after first performing the above-mentioned disc checking process in loading the CD in a disc changer. The method includes the steps of, in the disc check of a first data disc, performing an identification process of a last session thereof to obtain a PVD address of the last session, recording the PVD address in a memory, while linking it with a disc number, and reproducing the CD, while omitting the session identification process by reading out the recorded PVD address in the sequent reproducing operation.

Even in this method, however, it takes a long time to check all discs or CDs after firstly loading the CDs in the disc changer, as is the case with previous other methods.

SUMMARY OF THE INVENTION

Accordingly, it is a main object of the invention to provide an improvement which can perform a disc check in a short time which involves checking whether or not each disc loaded in a disc changer is reproducible in loading the discs in the disc changer.

In one aspect of the invention, a method for checking a disc in a disc changer includes the steps of selecting file system data from a disc selected for reproduction, and analyzing the file system data selected. The method also includes the steps of, when a reproducible file is detected during the analysis, generating a result of the disc check, while suspending the analysis and checking another disc.

In another aspect of the invention, a disc changer includes file data selection means for reproducing a selected disc and selecting file system data therefrom, and reproducible file detection means for detecting a reproducible file from a result of analysis of the file system data selected by the file data selection means. The reproducible file detection means is adapted to suspend the analysis when a reproducible file is detected during the analysis of the file system data, while generating a result of the disc check. The disc changer also includes disc selection instructing means for instructing the disc changer to select and reproduce a next disc when a reproducible file is detected by the reproducible file detection means.

In a further aspect of the invention, the above-mentioned disc changer may further include disc check result storing means for storing therein the result of the disc check.

In a still further aspect of the invention, in the above-mentioned disc changer, a lamp corresponding to the disc checked is lit depending on the result of the disc check.

With this arrangement, it is possible to perform the disc check in a short time which involves checking whether each disc loaded is reproducible or not in loading the discs in the disc changer.

BRIEF DESCRIPTION OF THE DRAWINGS

FIG. 1 is a functional block diagram of one preferred embodiment of the invention;

DESCRIPTION OF THE PREFERRED EMBODIMENTS

In the invention, checking whether each disc is reproducible or not when discs are loaded in a disc changer, that is, a disc check, can be carried out in a short time. More specifically, the invention is achieved by a disc check method which comprises the steps of selecting file system data from a disc selected for reproduction, analyzing the file system data selected, generating a result of the disc check when a reproducible file is detected during the analysis, suspending the analysis, and checking another disc.

First Embodiment

A first preferred embodiment of the invention will be described below with reference to the accompanying drawings. FIG. 1 is a functional block diagram showing the main functional parts associated with the operation of an exemplary CD player including a disc changer according to the embodiment. Note that each functional part in the figure for performing the corresponding function can be contemplated as any appropriate means for performing each function.

Figure 3:
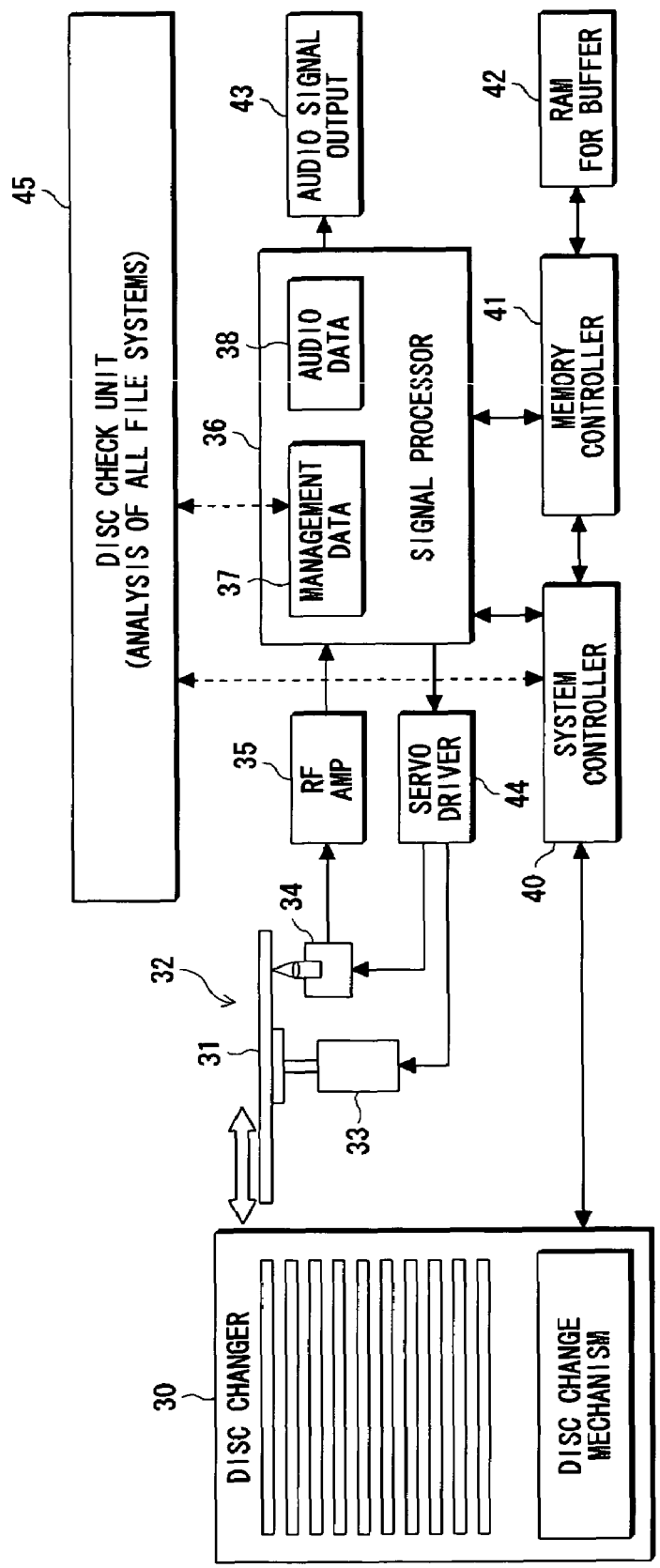
FIG. 3 is a functional block diagram of a conventional disc changer.

A reproduction processor of the disc changer as shown in FIG. 1 is the same as the reproduction processor of the conventional disc changer as shown in FIG. 3, except for a disc check processor 15 as shown. From among a number of CDs 2 loaded in the disc changer 1, an arbitrary one is selected, and played by a player 3, which is rotatably driven by a spindle motor 4, so that data recorded on the disc is read out by a pickup 5. An RF signal, a focus error signal, and a tracking error signal read are processed by a signal processor 7 via an RF amplifier 6.

The signal processor 7 separates management data 8 for management of reproduction of the CD from various types of data input, and a system controller 10 performs a predetermined reproduction operation based on the management data. When the presence of audio data reproducible by the player is detected from the management data, the signal processor 7 separates the reproducible audio data 9. If necessary, a predetermined amount of the audio data may be stored in a RAM for a buffer 12 via a memory controller 11. Alternatively or additionally, the audio data is read as an audio signal output 13 for performing an anti-vibration operation of the player.

The management data 8 as mentioned above is captured in a disc check processor 15 by a management data capturing section 16 of the processor 15. A file system data selector 18 selects file system data of the CD from among various pieces or types of captured management data, and provides it to a file system data analyzer 19. The file system data analyzer 19 analyzes various pieces of file system data expanded from a root directory R in the CD data such as that shown in FIG. 4, for example. A reproducible file detector 20 detects whether a reproducible file (indicated as mp3 in the figure) exists or not, based on a result of the analysis.

The result detected by the reproducible file detector 20 is sent by a check result output section 22 to the system controller 10. Also, the check result is stored in a disc check result storage section 21 as being linked with the disc checked, and is utilized as data in subsequent reproduction or the like. The system controller 10 sends a disc change signal for checking a next disc to a disc selection instructing section 17 based on the check result input. The disc selection instructing section 17 compares the discs checked and stored in the disc check result storage section 21 with the discs presently loaded in the disc changer 1, and selects a disc not checked yet to cause this next CD to be loaded on and read by the player 3 in place of the CD just checked.

Figure 2:
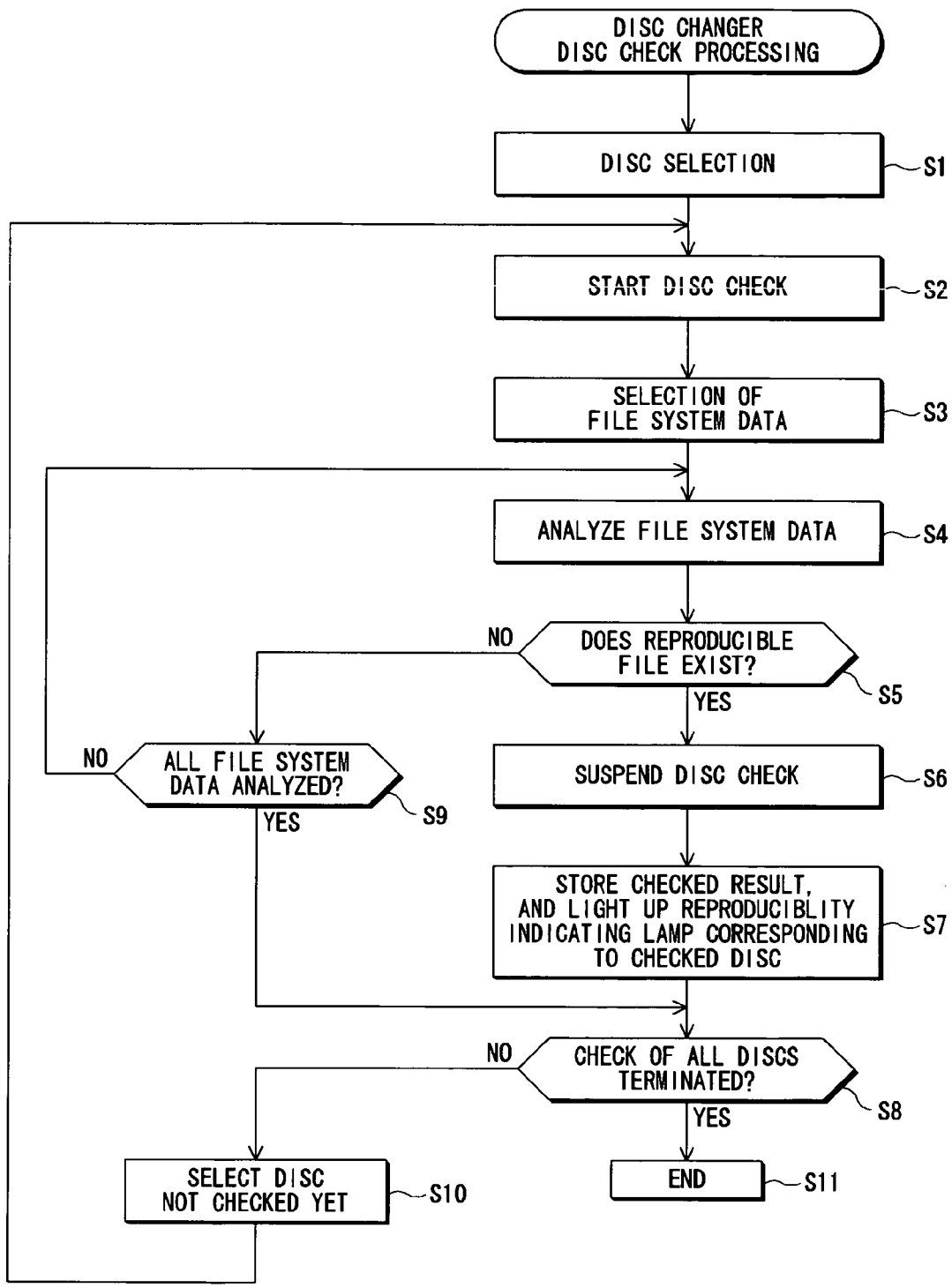
FIG. 2 is a flowchart of an operation of the embodiment.

The disc changer illustrated in the above-mentioned functional block diagram is operated according to an operational flowchart of FIG. 2, so that a number of discs loaded on the disc changer can be subjected to the disc check process in succession. Now, the operational flowchart of FIG. 2 will be described with reference to the functional block diagram of FIG. 1 and the example of the CD data format of FIG. 4.

In the disc check process performed by the disc changer as shown in FIG. 2, first, an arbitrary disc is selected from the discs loaded in the disc changer, and is played by the player to reproduce data thereon (step S1). Then, the data of the disc is read, and a disc check is started (step S2). Thereafter, file system data is selected from management data captured by the player (step S3).

Figure 4:
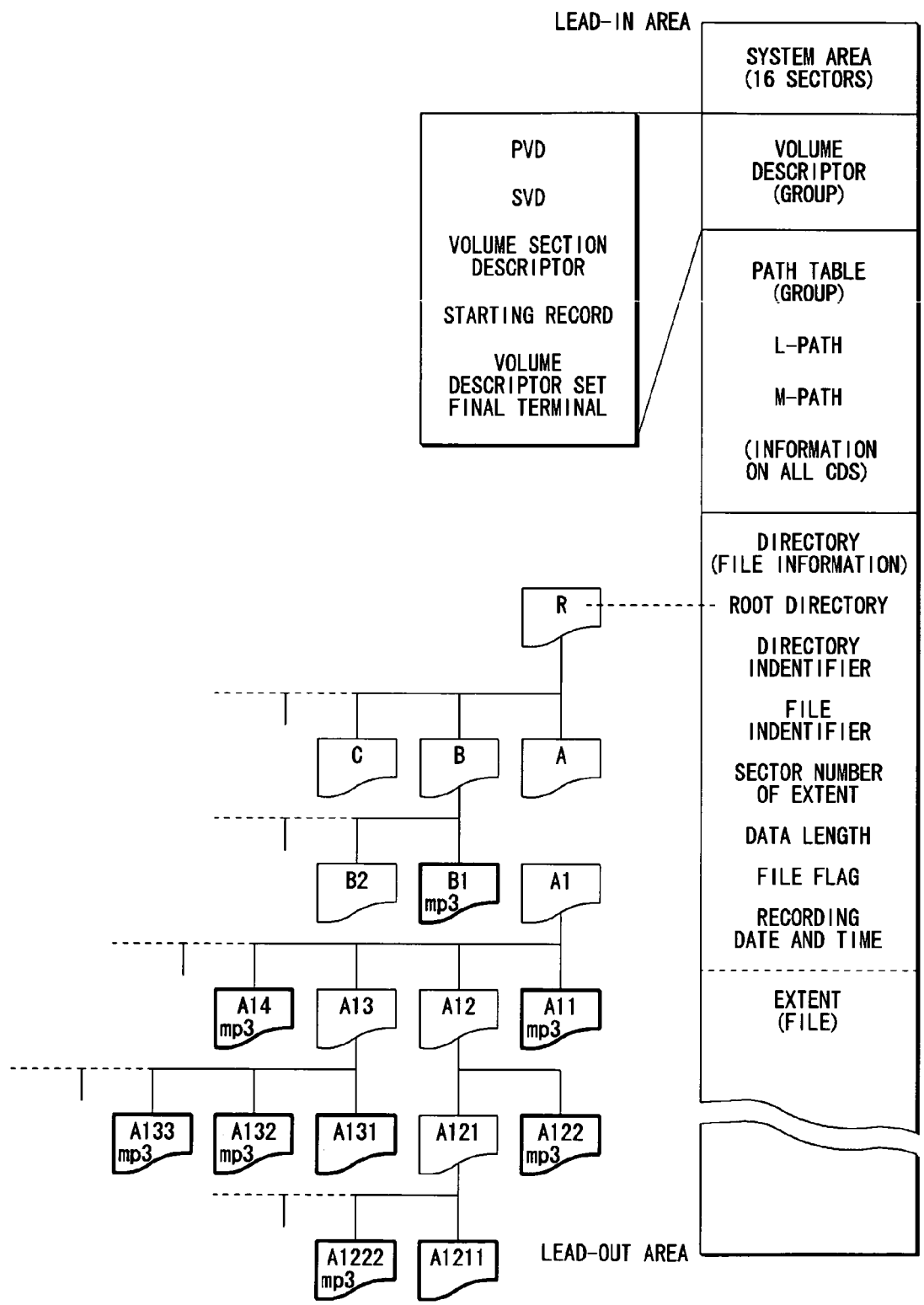
FIG. 4 is an example of a disc format of a CD.

More specifically, in the above-mentioned step, the file system data selector 18 of FIG. 1 selects the file system data from among the management data 8 separated by the signal processor 7 of the player. The CD data is recorded on the CD according to the ISO 9660 specification. For example, various types of data as shown in FIG. 4 are recorded in succession on the CD. Among the data, a directory part exists for indicating what kind of file structure the data recorded in the CD has. In the directory part, file structure components expanded in turn from the root directory R are recorded in succession by predetermined marks. Thus, the file system data selector 18 selects the data indicative of the file system.

Then, the file system data thus selected is analyzed (step S4), and it is determined whether a reproducible file exists or not (step S5). The determination can be carried out by the reproducible file detector 20 of FIG. 1 based on a result of data analysis performed by the file system data analyzer 19. As soon as a reproducible file is determined to exist as a result of the determination, the disc check of this disc is suspended (step S6).

An essential feature of the invention is this step. In the prior art, all pieces of file system data are analyzed at step S4, and it is determined whether a reproducible file exists or not, based on a result of the analysis. In contrast, in the invention, the reproducible file detector 20 is constantly detecting a condition of analysis performed by the file system data analyzer 19, that is, whether a reproducible file exists or not. As soon as even one reproducible file is detected, the disc check is suspended to send a signal to the disc selection instructing section 17. The disc selection instructing section 17 selects a disc not yet checked, and gives an instruction to play the disc.

Thus, when no reproducible file has been found yet while constantly determining whether a reproducible file exists or not at step S5, the operation proceeds to step S9, where it is determined whether all file system data has been analyzed or not. If all file system data has not been analyzed, the operation returns to step S4, and continues the analysis of the file system data. The invention differs much from the prior art technology in the continuous operation as mentioned above.

In the process of determining whether a reproducible file exists or not at step S5, when analyzing the file system expanded from the root directory R in succession in the directory as shown in FIG. 4, for example, when the data A, A1, A11, A12, etc. expanded from the root directory R are analyzed in succession, the detection of mp3 of A11 leads to a determination of the presence of reproducible audio data of the CD by the player. At this time, the sequential analysis is suspended, and a next disc check process will be started.

Note that, for example, in cases where the root directory R of level 1, the data A, B, C, etc. of level 2, the data A1, etc. and B1, B2, etc. of level 3 are analyzed in order of level in the analysis of the file system, when the presence of the mp3 audio data is detected in the file B 1, the CD is determined to include reproducible data, and the sequential analysis is suspended, resulting in the check of the next disc.

After suspending the disc check at step S6, the result of the disc check is stored together with code data of the CD, and a reproducibility indicating lamp corresponding to the checked disc is lit in the example shown (step S7). More specifically, at this step, when the reproducible file detector 20 of FIG. 1 detects a reproducible file as mentioned above, the file is stored in the disc check result storage section 21, and the disc check result is supplied from the check result output section 22 to the system controller 10. The system controller 10 causes the disc check result to be displayed at the lamp disposed for every tray of the disc changer 1, or at a display section or the like of a head unit apart from the disc changer.

Thereafter, it is determined whether the check of all discs has terminated or not (step S8). If all discs have not been checked yet, a disc not checked is selected (step S10), and the operation returns to step S2, so that the selected disc can be checked in the same manner as the other discs. If all discs have already been checked at step S8, the disc check process by the disc changer is terminated (step S11).

The disc changer according to the invention can be applied to any other disc changer for loading a plurality of discs which are capable of recording therein various types of data, as well as the CD changer.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A method for checking a disc in a disc changer, the method comprising:

selecting file system data from a selected disc in the disc changer;

analyzing the selected file system data in succession to detect whether or not a file has a reproducible file format;

when a file having a reproducible file format is detected during the analysis, generating a result of the disc check, and suspending said analysis; and checking another disc in the disc changer.

2. The method according to claim 1, wherein said reproducible file is an audio data file.

3. The method according to claim 2, wherein said audio data file is a file in CD audio track format or MPEG audio format.

4. The method according to claim 1, further comprising lighting a lamp corresponding to the disc on which the reproducible file is recorded, based on the result of the disc check.

5. The method according to claim 1, further comprising identifiably displaying the disc on which the reproducible file is recorded, based on the result of the disc check.

6. The method according to claim 1, wherein said disc is a compact disc.

7. A disc changer comprising:

file data selection means for reproducing a selected disc and selecting file system data therefrom;

reproducible file detection means for analyzing the file system data selected by said file data selection means in succession to detect whether or not a file has a reproducible file format, said reproducible file detection means being adapted to suspend the analysis when a file having a reproducible file format is detected during the analysis of the file system data, while generating a result of the disc check; and disc selection instructing means for instructing the disc changer to select and read a next disc when a reproducible file is detected by the reproducible file detection means.

8. The disc changer according to claim 7, wherein said reproducible file is an audio data file.

9. The disc changer according to claim 8, wherein said audio data file is a file in CD audio track format or MPEG audio format.

10. The disc changer according to claim 7, further comprising disc check result storing means for storing therein the result of the disc check.

11. The disc changer according to claim 7, further comprising a lamp corresponding to each disc, wherein the lamp corresponding to the disc on which the reproducible file is recorded is lit based on the result of the disc check.

12. The disc changer according to claim 7, further comprising a display section, wherein the disc on which the reproducible file is recorded is identifiably displayed based on the result of the disc check.

13. A method for checking a disc in a disc changer, the method comprising:

selecting file system data from a selected disc in the disc changer;

analyzing the selected file system data in succession to detect whether or not a file has a reproducible file format; and when a file having a reproducible file format is detected during the analysis, generating a result of the disc check, and suspending said analysis.

14. The method according to claim 13, wherein said reproducible file is an audio data file.

15. The method according to claim 14, wherein said audio data file is a file in CD audio track format or MPEG audio format.

16. The method according to claim 13, further comprising lighting a lamp corresponding to the disc on which the reproducible file is recorded, based on the result of the disc check.

17. The method according to claim 13, further comprising identifiably displaying the disc on which the reproducible file is recorded, based on the result of the disc check.

18. The method according to claim 13, wherein said disc is a compact disc.

* * * * *